United States Patent [19]

Schelhaas et al.

[11] Patent Number: 4,833,197

[45] Date of Patent: May 23, 1989

[54] PROCESS FOR PRODUCING A PRINTING-INK STOCK, AND PRINTING INK PRODUCED FROM SAID STOCK

[75] Inventors: Ealbertus W. Schelhaas, Heiloo; Franciscus J. M. Tordoir, Heerhugowaard, both of Netherlands

[73] Assignee: O+R Inktchemie B.V., En Zaandam, Netherlands

[21] Appl. No.: 190,265

[22] Filed: May 4, 1988

[30] Foreign Application Priority Data

May 7, 1987 [NL] Netherlands .................. 8701075

[51] Int. Cl.$^4$ .............................................. C08J 61/00
[52] U.S. Cl. ..................................... 524/594; 523/160; 106/20
[58] Field of Search .................... 524/594; 523/160; 106/20

[56] References Cited

U.S. PATENT DOCUMENTS 4,075,143  2/1978  Schelhaas et al. ............. 524/47
4,170,578  10/1979  Schelhaas ....................... 524/49

Primary Examiner—John Kight
Assistant Examiner—S. A. Acquah
Attorney, Agent, or Firm—Amster, Rothstein & Ebenstein

[57] ABSTRACT

This invention relates to a process for producing a printing-ink stock. According to the invention, a solid and oxidation-sensitive thermoplastic resin binder and a pigment are supplied to an extruder and combined therein to form a pigment dispersion. In an end zone of the extruder and/or shortly after discharge from the extruder, a liquid diluent is added to the pigment dispersion to produce a more or less viscous, liquid, stabilized product. The invention also relates to a printing ink produced from the product so obtained.

10 Claims, No Drawings

PROCESS FOR PRODUCING A PRINTING-INK STOCK, AND PRINTING INK PRODUCED FROM SAID STOCK

This invention relates to a process for producing a semi-manufactured product for use in preparing printing ink, referred to herein as a printing-ink stock, in which a thermoplastic resin binder and a pigment are combined by means of an extruder. The invention also relates to printing ink produced from said stock.

EP-A-0022746 discloses pigment compositions which, among other purposes, can be used for producing printing ink. These known compositions are based on the use of specific thermoplastic resins, namely certain copolymers of alkyl methacrylates, which can be combined with the pigment by means of all sorts of techniques. One such technique is melt mixing, which for example, can be carried out in an extruder. The extrudate thus produced is granulated and subsequently ground into fine powder. Accordingly, EP-A-0022746 is concerned with the production of a powdered product on the basis of specific thermoplastic resins which are highly polar and insensitive to oxidation. There is no disclosure as to how such a powdered product can be processed into printing ink, or what type of printing-ink can be prepared with it. In any case, such products are unsuitable formaking offset printing ink.

We have now found a simple and efficient method of preparing a more or less viscous liquid printing-ink stock which has an excellent stability and so is suitable for storage and sale. The stock can further be readily processed into a printing ink which is ready for use. Offset printing inks, in particular, can very well be made from such a semi-manufactured product.

The present invention is characterized by supplying a solid and oxidation-sensitive thermoplastic resin binder and the pigment to the extruder and combining these ingredients therein to form a pigment dispersion, and in an end zone of the extruder and/or shortly after discharge from the extruder, adding a liquid diluent to said pigment dispersion to produce a more or less viscous, liquid, stabilized product.

The present procedure results in an intimate combination between the solid thermoplastic resin binder and the pigment, or, in other words, the pigment surface is effectively wetted by the resin binder, without a mineral oil or any other diluent interfering with the so important initial phase of the combination. This results in a considerable improvement in quality of the final printing-ink, which in turn produces prints with a high gloss and a high wear resistance. As, in a subsequent stage of the production process, too, relatively little diluent will be sufficient, it is moreover achieved that the print will dry rapidly. Furthermore, the present process is excellently suitable for continuous production, in which production conditions can be controlled with facility and accuracy. Accordingly, the present process has a number of very important advantages.

The binder supplied to the extruder in accordance with this invention is a solid thermoplastic resin binder which is sensitive to oxidation, and can be supplied to the extruder in the form of lumps as well as in granulate or powdered form.

The pigment may be any organic or inorganic pigment of a type and colour as conventional for the final printing ink. The pigment is preferably supplied to the extruder as a dry powder, but a so-called pigment dough or pigment cake may be used, which contain a certain amount of water, which should be expelled in the initial zone of the extruder. This takes place, as it were, automatically via vapour vents, to be provided in the extruder wall, and this as a result of the heat in the extruder.

The solid thermoplastic resin binder and the pigment are supplied to the extruder in a ratio which is desirable for the printing ink in question, and owing to the action of the extruder, they are intimately combined, so that a homogeneous pigment dispersion is recovered at the extruder outlet. Naturally, large frictional forces and specifically shearing forces occur in the extruder, which generate a large amount of heat. Throughout the entire length of the extruder, thermoregulation should be effected so as to ensure a good throughput of the material being processed. This can be effected in an efficient manner by supplying heat to one or more zones of the extruder to suit requirements, for example, through electric shell heating, or dissipating heat, for example, by oil cooling, also through the shell or housing wall. A good throughput of the material through the extruder can also be promoted by adding suitable adjuvants in one or more zones, in particular organic liquids, such as mineral oils. Such substances are preferably added in the middle zone and/or in the end zone, where the wetting of the pigment by the binder is practically no longer disturbed.

Merely by way of illustration, it can be stated that when a colophony-modified phenol formaldehyde resin conventional for offset printing ink is used, the temperature in the initial zone of the extruder is around 150° C., in the middle zone 160°–180° C., and in the end zone 170°–180° C.

The extruder may be of any known type with a single or double screw. The hardness, pitch (or rise) and the coating of the screw or screws can be selected as a function of the product one wishes to prepare.

In addition to the inlet and outlet openings, the extruder may be provided with one or more further inlets for the addition of further substances, depending on the printing ink type one wishes to produce from the stock.

The pigment-binder dispersion is diluted and stabilized by adding a liquid diluent in the end zone of the extruder and/or shortly after the discharge from the extruder, preferably a mineral oil, so that after cooling a more or less viscous, liquid, stable product is obtained which forms the present semi-manufactured product.

To prepare the printing ink, the more or less viscous liquid semi-manufactured product is processed further by carrying out mixing operations, in which various additional ingredients are added, depending on the type of printing ink to be prepared. Examples of such ingredients are: stabilizers, brighteners, liquid cross-linkable modified polyesters, thickening agents, catalysts, siccatives, etc.

Various kinds of printing inks can be produced using the present process, but it is preferably used for preparing stocks for making various types of offset printing ink, for example offset printing ink which can be dried quickly by the action of heat, in particular by infrared irradiation, such as the printing inks disclosed in U.S. Pat. No. 4,075,143 and 4,170,578.

In the preparation of a printing-ink stock for making an offset printing ink, the pigment, the solid thermoplastic resin binder and the diluent are preferably used in proportions of 15–40%, 40–70% and 8–15%, by weight, respectively.

An offset printing ink produced from such a stock and ready for use generally comprises, by weight, 10–30% of organic or inorganic pigments, 50–60% of solid, oxidation-sensitive thermoplastic resin binders, such as modified phenol or cresol formaldehyde resins, derivatives of dimerized colophony esters and/or maleinate resins, and of liquid resin binders, such as liquid cross-linkable modified polyesters, and $20 \geqq 30\%$ of liquid diluents, for example, mineral oils with a boiling range of 200°–350° C., and no more than 20% of aromatic components.

The invention is illustrated in and by the following example.

Example

Pigment blue 15:3 (CI 74160) and a mixture of colophony-modified phenol formaldehyde resins (melting temperature 140°–160° C.) were supplied to a single-screw extruder in a pigment/resin ratio by weight of 5/9. In the initial zone of the extruder, the temperature was maintained at about 150° C. in the middle zone at 170°–175° C., and in the end zone at about 180° C. During its passage through the extruder, the pigment was thoroughly dispersed into the resin. The dispersion was discharged from the extruder and immediately, while still at a high temperature, and while the dispersion was still liquid, brought into a condition of a liquid product which was highly viscous at room temperature, by adding 8–12% by weight of mineral oil, as specified above, calcualted on the total composition, and which product is a stable offset printing-ink stock.

After further conventional ingredients had been added to, and mixed with, the stock, an offset printing ink was obtained which when used in offset printing sheets resulted in fast-drying prints which after drying exhibited a high gloss and a high wear-resistance.

A printing ink with a similar composition, prepared in a conventional manner dried less fast, and the dried print was less glossy and less wear-resistant.

We claim:

1. A process for producing a printing-ink stock, in which a thermoplastic resin binder and a pigment are combined by means of an extruder, characterized by supplying a solid and oxidation-sensitive thermoplastic resin binder and the pigment to the extruder and combining these ingredients therein to form a pigment dispersion, and in an end zone of the extruder and/or shortly after discharge from the extruder, adding a liquid diluent to said pigment dispersion to produce a more or less viscous, liquid, stablized product.

2. A process as claimed in claim 1, characterized by using as the solid thermoplastic resin binder a modified phenol or cresol formaldehyde resin.

3. A process as claimed in claim 1, characterized in that the pigment is supplied as a dry pigment.

4. A process as claimed in claim 1, characterized in that the pigment is supplied in the form of a dough, and means are provided in the initial zone of the extruder for the removal of unwanted liquid.

5. A process as claimed in claim 1, characterized in that the effective passage of the material being processed through the extruder is at least partly ensured by adding or removing heat from one or more zones of the extruder as required.

6. A process as claimed in claim 1, characterized in that the effective passage of the material being processed through the extruder is ensured at least in part by adding suitable adjuvants, specifically organic liquids, to one or more zones of the extruder to suit requirements.

7. A process as claimed in claim 1, characterized by using the pigment, the solid thermoplastic resin binder and the diluent in proportions of 15–40%, 40–70% and 8–15%, by weight, respectively, to produce an offset printing-ink stock.

8. A process as claimed in claim 1, characterized by adding further substances to suit requirements and depending on the printing ink type in question while the product is still in the extruder and/or after the product has been discharged from the extruder.

9. A printing ink produced from a printing-ink stock prepared in accordance with the process of claim 1.

10. A printing ink as claimed in claim 9, characterized in that the printing ink is an offset printing ink comprising 10–30% of pigments, 50–60% of resin binders and 20–30% of diluents.

* * * * *